United States Patent
Cohen et al.

[11] Patent Number: 5,906,743
[45] Date of Patent: *May 25, 1999

[54] FILTER WITH ZEOLITIC ADSORBENT ATTACHED TO INDIVIDUAL EXPOSED SURFACES OF AN ELECTRET-TREATED FIBROUS MATRIX

[75] Inventors: Bernard Cohen, Berkeley Lake; Lee Kirby Jameson, Roswell, both of Ga.

[73] Assignee: Kimberly Clark Worldwide, Inc., Neenah, Wis.

[*] Notice: This patent is subject to a terminal disclaimer.

[21] Appl. No.: 08/449,041

[22] Filed: May 24, 1995

[51] Int. Cl.⁶ .................................................. B01D 39/08
[52] U.S. Cl. ....................... 210/502.1; 210/505; 210/507
[58] Field of Search ................................ 210/502.1, 505, 210/507; 502/401, 402, 407, 414

[56] References Cited

U.S. PATENT DOCUMENTS

| | | | |
|---|---|---|---|
| 2,375,550 | 5/1945 | Grossman | 99/59 |
| 2,391,981 | 1/1946 | Kremers | 260/256 |
| 2,416,484 | 2/1947 | Kremers | 260/256 |
| 2,472,881 | 6/1949 | Bender | 260/256 |
| 3,108,876 | 10/1963 | Turken et al. | 99/69 |
| 3,130,007 | 4/1964 | Breck | 23/113 |
| 3,998,988 | 12/1976 | Shimomai et al. | 428/400 |
| 4,215,682 | 8/1980 | Kubik et al. | 128/205.29 |
| 4,239,516 | 12/1980 | Klein | 210/505 |
| 4,324,840 | 4/1982 | Katz | 426/422 |

(List continued on next page.)

FOREIGN PATENT DOCUMENTS

| | | |
|---|---|---|
| 0 013 451 | 7/1980 | European Pat. Off. . |
| 2 416 535 | 8/1979 | France . |
| 553758 | 6/1932 | Germany . |
| 2713963 | 10/1978 | Germany . |
| 3 839 956 | 6/1989 | Germany . |
| 4 034 798 | 5/1992 | Germany . |
| 4344805 | 7/1994 | Germany . |
| 150 780 | 11/1931 | Switzerland . |
| 1409200 | 7/1988 | U.S.S.R. . |
| 1488340 | 10/1977 | United Kingdom . |
| 2 027 662 | 2/1980 | United Kingdom . |
| 2 080 350 | 2/1982 | United Kingdom . |
| 2 154 894 | 9/1985 | United Kingdom . |
| 93/06924 | 4/1993 | WIPO . |

OTHER PUBLICATIONS

Patent Abstracts of Japan, vol. 14, No. 109 (C–0695) & JP,A,01 313020 (Matsushita Electric), Dec. 18, 1989, see abstract.
Patent Abstracts of Japan, vol. 7, No. 53 (C–154) Mar. 3, 1983 & JP,A,57 204211 (Kureha Kagaku Kogyo), Dec. 14, 1982, see abstract.
Derwent Publications Ltd., London, GB; Class 13, AN 93–003762; & JP,A,04 330 908 (Shinozaki), Nov. 18, 1992, see abstract.
Derwent Publications Ltd., London, GB; Class D23, AN 84–221871 & JP,A,59 129 297 (Matsushita Elec Ind), Jul. 25, 1984, see abstract.

Primary Examiner—Ivars Cintins
Attorney, Agent, or Firm—J. E. Ruland

[57] ABSTRACT

An adsorbent filter for removing caffeine from liquids. The filter is composed of a liquid permeable, electret-treated matrix of fibrous material having individual exposed surfaces; and a relatively uniform distribution of adsorbent zeolite particulate material attached to individual exposed surfaces of the electret-treated fibrous material by substantially non-transient bonding, so that passage of a liquid having a caffeine concentration ranging from about 20 to about 100 mg per 100 mL of liquid through the matrix for a contact time of less than about 2 minutes results in at least a 40 percent reduction in the caffeine concentration of the liquid. The matrix of fibrous material may be selected from woven fabrics, knit fabrics and nonwoven fabrics. Generally speaking, the filter can be adapted to provide at least a 40 percent reduction in the caffeine concentration for about 1 cup to about 40 cups of a liquid.

17 Claims, 4 Drawing Sheets

U.S. PATENT DOCUMENTS

| | | | |
|---|---|---|---|
| 4,331,694 | 5/1982 | Izod | 426/422 |
| 4,528,200 | 7/1985 | Coleman | 426/74 |
| 4,810,381 | 3/1989 | Hagen et al. | 210/502.1 |
| 4,976,979 | 12/1990 | Klima et al. | 426/427 |
| 5,110,620 | 5/1992 | Tani et al. | 427/40 |
| 5,208,056 | 5/1993 | Fischer et al. | 426/422 |
| 5,237,945 | 8/1993 | White | 112/420 |
| 5,296,137 | 3/1994 | Gershon et al. | 210/253 |
| 5,304,305 | 4/1994 | Lehrer | 210/346 |
| 5,346,566 | 9/1994 | White | 156/71 |
| 5,389,166 | 2/1995 | White | 156/71 |
| 5,401,446 | 3/1995 | Tsai et al. | 204/165 |
| 5,468,536 | 11/1995 | Whitcomb et al. | 428/98 |

FILTER WITH ZEOLITIC ADSORBENT ATTACHED TO INDIVIDUAL EXPOSED SURFACES OF AN ELECTRET-TREATED FIBROUS MATRIX

FIELD OF THE INVENTION

The present invention relates to an adsorbent filter system for liquids. More particularly, the present invention relates to sheet or web materials that incorporate adsorbent particulate materials used with liquids.

BACKGROUND OF THE INVENTION

Conventional industrial processes to decaffeinate liquids such as, for example, coffee include: 1) solvent decaffeination, where a solvent such as ethyl acetate is used to extract caffeine from pre-wetted starting material such as, for example, green coffee beans; 2) super-critical carbon dioxide, which uses an inert gas (carbon dioxide) to act as a solvent and remove caffeine from starting material such as, for example, green coffee beans; and 3) water decaffeination, which uses an aqueous extract (e.g., aqueous coffee extract containing equilibrium quantities of the non-caffeine soluble solids but no caffeine) to extract essentially only caffeine from a starting material such as, for example, green coffee beans.

The use of clays, zeolites, activated carbon, or ion-exchange resins as decaffeination aids or processes has been reported in the literature, although these materials are not in wide-scale industrial use. Generally speaking, such materials are used to decaffeinate only caffeine-containing liquids. The removed caffeine cannot be easily recovered once it has adsorbed/absorbed onto clays, zeolites, activated carbon, or ion-exchange resins. In contrast, most conventional industrial decaffeination processes decaffeinate solid starting materials such as, for example, coffee beans. Such conventional industrial processes are generally designed to recover the caffeine which is sold as a chemical once removed from the coffee, tea, cola or other source.

In some decaffeination processes, bentonite clay is mixed with a liquid such as, for example, brewed coffee for about 45 minutes. The bentonite clay is removed by either settling/decanting, filtering, or centrifuging the slurry. Although a large proportion of the caffeine may be removed using this technique, separation of the bentonite clay from the liquid poses problems. A consumer would not wish to wait 45 minutes before having decaffeinated beverages (e.g., decaffeinated coffee), and would not have available centrifugation or the high-pressure filtration required to remove the bentonite.

Accordingly, there is a need for a practical device which uses an adsorbent to remove caffeine from liquids. For example, there is a need for a filter that incorporates clays or zeolites to adsorb caffeine from liquids in order to produce a practical consumer product. A need exists for a filter containing an adsorbent such as, for example, bentonite clays and/or zeolites which could be used in a similar manner as a conventional coffee filter (either basket- or cone-type) to decaffeinate up to an entire pot of coffee or tea as the beverage brewed. A need also exists for a filter containing an adsorbent such as, for example, bentonite clays and/or zeolites which could be used to decaffeinate individual cups of liquid such as, for example, coffee, tea or cola.

There is also a need for a filter that is adapted to decaffeinate liquids within 1 or 2 minutes. A need also exists for a filter that is adapted to decaffeinate liquids cleanly without adsorbent particles passing into the liquid/filtrate and without the need for high pressure differentials. There is also a need for a filter that is adapted to successfully decaffeinate liquids at a wide range of temperatures.

DEFINITIONS

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, meltblowing, spunbonding and bonded-carded web processes.

As used herein, the term "spunbond web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent No. 803,714.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al.

As used herein, the term "microfibers" means small diameter fibers having an average diameter not greater than about 100 micrometers ($\mu$m), for example, having a diameter of from about 0.5 micrometers to about 50 micrometers, more specifically microfibers may also have an average diameter of from about 1 micrometer to about 20 micrometers. Microfibers having an average diameter of about 3 micrometers or less are commonly referred to as ultra-fine microfibers. A description of an exemplary process of making ultra-fine microfibers may be found in, for example, U.S. Pat. Nos. 5,213,881 and 5,271,883, entitled "A Nonwoven Web With Improved Barrier Properties", incorporated herein by reference in their entirety.

As used herein, the term "thermoplastic material" refers to a high molecular weight polymer that softens when exposed to heat and returns to its original condition when cooled to room temperature. Natural substances which exhibit this behavior are crude rubber and a number of waxes. Other exemplary thermoplastic materials include, without limitation, polyvinyl chloride, polyesters, nylons, polyfluorocarbons, polyethylene, polyurethane, polystyrene, polypropylene, polyvinyl alcohol, caprolactams, and cellulosic and acrylic resins.

As used herein, the term "electrically charged sites at individual exposed surfaces" refers to locations of electrostatic charge on or beneath the surface of a dielectric material due to electret formation or by constant application of an electric field to the surface of a non-dielectric material.

As used herein, the term "sintering" refers to agglomeration of materials by heating to a temperature below the melting point. Generally speaking, when materials having different melting temperatures are sintered, they are heated to a temperature below the melting point of the highest melting-point material. According to the present invention, sintering may be carried out exclusively by application of heat or by combinations of heat and pressure. Under the present definition, sintering may be carried out independently of changes to the surface area of the material sintered.

The term "pulp" as used herein refers to cellulosic fibers from natural sources such as woody and non-woody plants. Woody plants include, for example, deciduous and coniferous trees. Non-woody plants include, for example, cotton, flax, esparto grass, sisal, abaca, milkweed, straw, jute, hemp, and bagasse.

As used herein, the term "cup" is a unit of measure generally referring to a 170-mL portion of liquid.

As used herein, the terms "zeolite" and "zeolitic" refer to molecular-sieve zeolites that are crystalline aluminosilicates of group IA and Group IIA elements such as sodium, potassium, magnesium, and/or calcium. Molecular-sieve zeolites may be natural zeolite minerals or synthetic zeolites. Natural zeolite minerals include, but are not limited to, analcime, chabazite, clinoptilolite, erionite, faujasite, harmotome, heulandite, mordenite, natrolite, philipsite, scolecite, and stilbite. Synthetic zeolites include, but are not limited to, zeolite A, zeolite X, zeolite Y, and zeolite L. Generally speaking, zeolites are complex, crystalline inorganic polymers based on an expansive extending framework of $AlO_4$ and $SiO_4$ tetrahedra linked to each other by the sharing of oxygen ions. This framework contains channels or interconnected voids which, when empty, presents a host structure permeated by micropores that may amount to 50% of the crystals by volume.

As used herein, the term "clay minerals" refers to minerals of the smectite group (often referred to in early literature as the "montmorillonite" group). Clay minerals of the smectite group include, but are not limited to, montmorillonite, beidellite, nontronite, hectorite, saponite, and sauconite. Generally speaking, clay minerals of the smectite group are particles, grains and crystals having a layered or sheet-like structure. These clay minerals typically contain Al, Mg, Na, Si, O, and are hydrated, although other elements may be present. For example, montmorillonite has the general formula $[Al_{1.67}Mg_{0.33}(Na_{0.33})]Si_4O_{10}(OH)_2$. Cations (e.g., Na, Ca, K) may be sorbed between the layers. Clay minerals are composed of extremely fine particles, grains and crystals often having a diameter of less than about 4 micrometers. Bentonite is a clay that is rich in montmorillonite and is intended to be encompassed in the present use of the term "clay minerals".

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

SUMMARY OF THE INVENTION

The present invention responds to the needs described above by providing an adsorbent filter for removing caffeine from liquids. The filter is composed of a matrix of fibrous material having individual exposed surfaces; and a relatively uniform distribution of adsorbent particulate material attached to individual exposed surfaces of the fibrous material (e.g., individual fiber surfaces) by substantially non-transient bonding. Desirably, the distribution of adsorbent particulate material on individual exposed surfaces of the fibrous material is a relatively uniform distribution. In an aspect of the invention, it is desirable that the filter is configured so that passage of a liquid having a caffeine concentration ranging from about 20 to about 100 mg per 100-mL of liquid through the matrix for a contact time of less than about 2 minutes results in at least a 40 percent reduction in the caffeine concentration of the liquid. Generally speaking, the filter can be adapted to provide at least a 40 percent reduction in the caffeine concentration for about 1 cup to about 40 cups of a liquid. For example, the filter can be adapted to provide at least a 60 percent reduction in the caffeine concentration for about 1 cup to about 40 cups of a liquid. As another example, the filter can be adapted to provide at least a 80 percent reduction in the caffeine concentration for about 1 cup to about 80 cups of a liquid. The liquid to be treated may be selected from, for example, coffee, tea, and cola.

The matrix of fibrous material may be selected from woven fabrics, knit fabrics and nonwoven fabrics (i.e., nonwoven to webs). The nonwoven fabrics may be selected from nonwoven webs of meltblown fibers, nonwoven webs of continuous spunbonded filaments, and bonded carded webs. In one aspect of the invention, the matrix of fibrous material may further include one or more entangled or entrapped secondary materials. As an example, a nonwoven web of meltblown fibers may also include materials such as, for example, synthetic fibers, natural fibers and wood pulp.

The fibrous material may be selected from thermoplastic polymer fibers and thermoplastic polymer filaments. If the fibrous material is made of a thermoplastic polymer, the thermoplastic polymer may be a polymer selected from polyolefins, polyamides and polyesters. If polyolefins are used, they may be, for example, polyethylene, polypropylene, polybutene, ethylene copolymers, propylene copolymers, and butene copolymers and blends of the same. According to the invention, at least a portion of the fibrous material may be a bi-component fibrous material such as, for example, bi-component fibers and bi-component filaments.

The adsorbent material is selected from clay minerals and zeolites. Desirably, the clay minerals are smectite minerals such as, for example, montmorillonite clays. More desirably, the clay minerals are bentonite clays (i.e., clay material rich in montmorillonite). Desirably, the bentonite clays are calcium bentonite clays, acidified bentonite clays and/or modified bentonite clays containing a flocculating agent. Suitable flocculating agents include, for example, gelatin.

The zeolites are selected from natural zeolites and synthetic, crystalline, zeolitic sodium aluminosilicates of the molecular sieve type. For example, the zeolites may be synthetic crystalline zeolite Y and/or zeolitic aluminosilicates having a $SiO_2/Al_2O_3$ molar ratio of from 4.5 to 35 and the essential X-ray powder diffraction pattern of zeolite Y.

The adsorbent particulate material may have an average size of from about 0.1 micrometer ($\mu$m) to about 400 micrometers. For example, the particulate material may have an average size of from about 0.5 micrometer to about 200 micrometers. As a further example, the particulate material may have an average size of from about 1 micrometer to about 100 micrometers. In an embodiment of the invention, the particulate material may have an average size that is about the same as the average diameter of the fibrous material. Desirably, the particulate material has an average size which is less than the average diameter of the fibrous material. In another embodiment of the invention, the particulate material may have an average size which is from about 0.1 to about 0.001 times the average diameter of the fibrous material. In an embodiment of the invention, it is desirable for the particulate material to have an average size ranging from about 0.1 micrometer to about 75 micrometers. For example, the particulate material may have an average size of from about 0.5 micrometer to about 50 micrometers. As a further example, the particulate material may have an average size of from about 0.5 micrometer to about 5 micrometers.

In an embodiment of the invention, passage of from about 1 cup to about 40 cups of a liquid having a caffeine concentration ranging from about 20 to about 100 mg per 100 mL of liquid through the adsorbent filter for a contact time of from about 30 seconds to about 2 minutes results in at least a 40 percent reduction in the caffeine concentration of the liquid. In another embodiment of the invention, passage of from about 1 cup to about 40 cups of a liquid having a caffeine concentration ranging from about 20 to about 100 mg per 100 mL of liquid through the matrix for a contact time of from about 30 seconds to about 2 minutes results in at least a 60 percent reduction in the caffeine concentration of the liquid. In yet another embodiment of the invention, passage of from about 1 cup to about 40 cups of a liquid having a caffeine concentration ranging from about 20 to about 100 mg per 100 mL of liquid through the matrix for a contact time of from about 30 seconds to about 2 minutes results in at least an 80 percent reduction in the caffeine concentration of the liquid. Embodiments of the invention can be designed to have similar levels of caffeine removal efficiency for liquid amounts ranging from about 1 to 20 cups or even 1 to 12 cups.

In another aspect of the invention, the ability of the adsorbent filter to remove caffeine from liquids is relatively independent of temperature. That is, the adsorbent filter desirably may remove relatively similar amounts of caffeine from liquid whether the liquid is at a temperature between 25° C. to 75° C.

The adsorbent filter may be treated with a surfactant. For example, the filter may be treated with a food grade surfactant to promote wetting of the filter and passage of liquid through the filter. Alternatively and/or additionally, the adsorbent filter may be configured to contain hydrophilic fibers to promote wetting of the filter and passage of liquid through the filter. For example, the adsorbent filter may contain at least about 40 percent, by weight, hydrophilic fibers. As another example, the adsorbent filter may contain about 60 percent, by weight, or more hydrophilic fibers. The hydrophilic fibers may be in the form of cellulosic textile fibers, pulp and/or hydrophilically transmuted hydrophobic fibers (i.e., hydrophobic fibers rendered hydrophilic by use of internal, external and/or surface modification).

According to the invention, the adsorbent filter for removing caffeine from liquids may have a basis weight of from about 6 to about 400 grams per square meter. The present invention also encompasses a multilayer adsorbent filter composed of at least two layers of the adsorbent filter. In yet another aspect of the present invention, the multilayer adsorbent filter may be composed of at least one layer of the adsorbent filter and at least one other layer. The other layer may be, for example, woven fabrics, knit fabrics, bonded carded webs, continuous spunbond filament webs, melt-blown fiber webs, films, apertured film-like materials, and combinations thereof.

The present invention encompasses a method of making an adsorbent filter for the removal of caffeine from liquids by attaching a distribution of adsorbent particulates to individual exposed surfaces of a matrix of fibrous material (e.g., individual fiber surfaces). Desirably, the method of making an adsorbent filter produces a relatively uniform distribution of attached adsorbent particulates on individual exposed surfaces of a matrix of fibrous material. The method includes the following steps: 1) electrically charging a matrix of fibrous material having individual exposed surfaces to create a relatively uniform distribution of charged sites at the individual exposed surfaces; 2) applying adsorbent particulates to the charged matrix of fibrous material so that at least some particulates adhere at the charged sites; and 3) attaching adsorbent particulates adhering to the fibrous material at charged sites by substantially non-transient bonding.

In one aspect of the invention, the adsorbent particulates adhering to the fibrous material at charged sites may be attached by substantially non-transient bonding produced by bonding techniques using, for example, heat, adhesives, chemical reaction and/or interfacial energy between particulate surfaces and the surfaces of fibrous material.

When heat-bonding is utilized, heat may be supplied by means such as, but not limited to, infra-red radiation, steam cans, hot ovens, microwaves, flame, hot gases, hot liquid, and radio frequency heating.

DETAILED DESCRIPTION OF THE INVENTION

Figure 1:
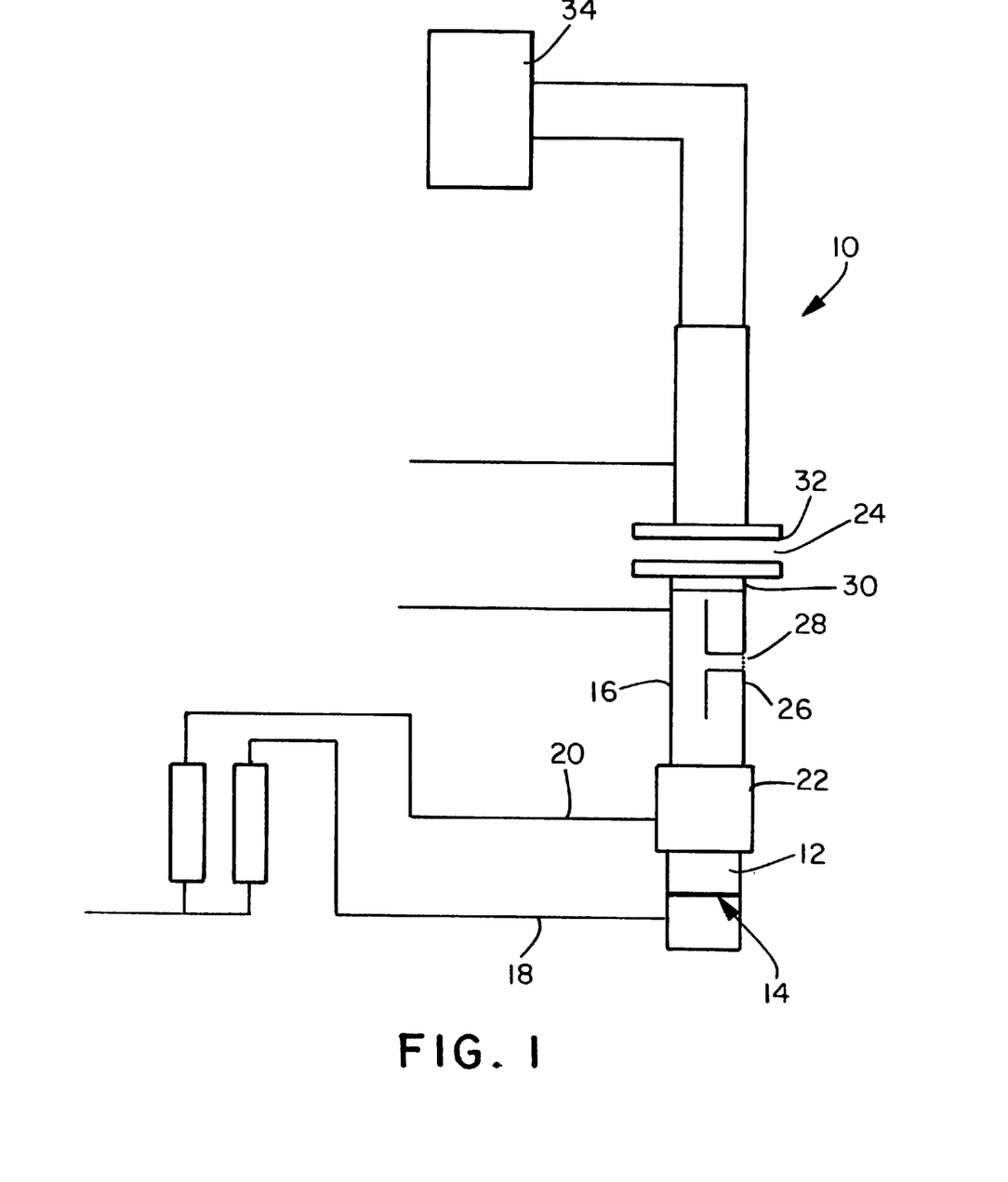
FIG. 1 is an illustration of an exemplary method for attaching a relatively uniform distribution of particulates to individual exposed surfaces of fibers in a matrix of fibrous material.

Referring to the drawing and in particular to FIG. 1, there is shown, not necessarily to scale, at 10 an exemplary method of making an adsorbent filter to remove caffeine from liquids. The filter is made by attaching a relatively uniform distribution of adsorbent particulates to individual exposed surfaces of fibers in a matrix of fibrous material. For ease of description, the matrix of fibrous material will be referred to as a "permeable material".

A finely divided solid caffeine-selective adsorbent material (i.e., particulates or fine fibers) 12 is placed on a screen 14 in a fluidization chamber 16. A gas under pressure enters the chamber under the screen 14 via a primary air supply 18. The primary gas supply 18 entrains the adsorbent particulates 12 creating a suspension of particulates 12 (e.g., particulate cloud) in the chamber. A boost gas supply 20 which enters the chamber 16 through a flow amplifier 22 above the screen 14 may be used to lift (boost) the suspension of particulates 12 (particulate cloud) toward a permeable material 24. If necessary, one or more boost gas supplies may be used. The primary and boost gases should be relatively dry and may be, but are not limited to, air, carbon dioxide, nitrogen and the like.

A permeable material 24 (i.e., matrix of fibrous material) to be treated is located at the top of the chamber 16 and is held in place by a bracket. Generally speaking, the permeable material 24 should be permeable enough to allow a sufficient flow of gas to maintain a gas-borne suspension of particulates in the chamber (i.e., allow operation of the fluidized bed). For example, and without limitation, the permeable material may have a permeability of about 10 $cfm/ft^2$, as measured for a substantially dry sheet prior to processing. As another example, the permeable material may have a permeability of 20 to over 200 $cfm/ft^2$, as measured for a substantially dry sheet prior to processing.

In this context, the term "permeable" refers to the ability of a fluid (e.g., a gas) to pass through a matrix of fibrous material. Permeability may be expressed in terms of volume per unit of time per unit of area of the material. For example, permeability may be expressed in terms of (cubic feet per minute) per square foot of material (e.g., ($ft^3$/minute/$ft^2$) or ($cfm/ft^2$)). Permeability may be readily determined utilizing a Frazier Air Permeability Tester available from the Frazier Precision Instrument Company and measured in accordance with Federal Test Method 5450, Standard No. 191A.

According to the invention, the permeable material 24 should have individual exposed surfaces. The permeable material is a gas permeable matrix of fibrous material having individual exposed surfaces of fibrous material. The permeable material may be, but is not limited to, meltblown fibrous webs, continuous spunbonded filament webs, bonded carded fibrous webs, and wet-laid fibrous webs. The fibrous material may be synthetic fibers, natural fibers, bicomponent fibers, or continuous filaments having various deniers and lengths. Various mixtures of pulp fibers and these other types of fibers may be used. For example, the fibrous component of the adsorbent composite material may contain from about 5 to about 50 percent, by weight, staple length fibers and from about 50 to 95 percent, by weight pulp fibers.

The synthetic fibers may be made from rayon, polyester, polyamides and polyolefins such as, for example, one or more of polyethylene, polypropylene, polybutene, ethylene copolymers, propylene copolymers and butene copolymers. Natural fibers may include, for example, cotton, cotton linters, wool, silk, and flax. Typically, these fibers will have a denier in the range of about 0.7 to about 8 and an average length in the range of about 5 mm to about 36 mm. For example, the fibers may have a denier in the range of about 0.9 to about 3 and an average length in the range of about 10 mm to about 24 mm. Desirably, the fibers may have a denier in the range of about 1 to about 2 and an average length in the range of about 12 mm to about 18 mm.

The permeable material 24 is electrically charged. If the permeable material 24 is a dielectric, this may be accomplished by passing the material through a high voltage electric field to form an electret or electrical charge which persists at least until the non-transient bonding occurs.

Generally speaking, techniques for charging nonconductive webs are known. These methods include, for example, thermal, liquid-contact, electron beam and corona discharge methods. For example, corona discharge charging of nonconductive webs is described in U.S. Pat. No. 4,588,537, the contents of which regarding the charging of webs is herein incorporated by reference. As another example, charging of nonconductive webs between the surface of a grounded metal electrode and a series of discharge electrodes is described in U.S. Pat. No. 4,592,815, the contents of which regarding the charging of webs is herein incorporated by reference.

One technique of interest involves applying high voltage electric fields via direct current (i.e., DC) to form an electret. This "cold-charging" technique is described in U.S. Pat. No. 5,401,446, incorporated herein by reference. Generally speaking, the technique involves subjecting a material to a pair of electrical fields wherein the electrical fields have opposite polarities. For example, the permeable material may be charged by sequentially subjecting the material to a series of electric fields such that adjacent electric fields have substantially opposite polarities with respect to each other. Thus, one side of the permeable material is initially subjected to a positive charge while the other side of the permeable material is initially subjected to a negative charge. Then, the first side of the permeable material is subjected to a negative charge and the other side of the permeable material is subjected to a positive charge.

It is important to note that the terms "positive" and "negative" are meant to be relative terms. For example, a pair of electrodes will have a positive electrode and a negative electrode any time there is a difference in potential between the two electrodes. In general, the positive electrode will be the electrode with the more positive (or less negative) potential, while the negative electrode will be the electrode with the more negative (or less positive) potential.

The strength of the electric field used to charge the permeable material may vary and can be appropriately determined by those of ordinary skill in the art. Generally speaking, the permeable material may be subjected to electric fields which are between about 1 kVDC/cm and about 12 kVDC/cm. For example, electrical fields between about 5 kVDC/cm and 7.5 kVDC/cm have been found to be suitable.

Once the permeable material 24 has been formed into an electret, the material could have an overall positive (+) charge, an overall negative (−) charge, a positive (+) charge at one surface and a negative (−) charge at an opposite surface, various other combinations of charges distributed over the permeable material. In some situations, a surface charge may be undetectable although charges might be distributed in the interior portions of the permeable material.

If the permeable material is a dielectric, it may be prepared from nonconductive polymeric material such as, for example, polyolefins, polyamides, polyesters and polycarbonates. The polyolefins may be, for example, polyethylene, polypropylene, polybutene, ethylene copolymers, propylene copolymers, and butene copolymers and blends of the same. Additionally, the permeable material may be a composite containing both conductive and nonconductive material. For example, if the permeable material is a fibrous material, it may be a composite including materials such as meltblown/cotton/meltblown thermally bonded webs or meltblown/cotton hydroentangled or needle-punched webs, hydroentangled mixtures of staple fibers and pulp, hydroentangled mixtures of continuous filaments and pulp, coformed webs, films, and the like.

If the permeable material 24 is non-dielectric, imparting an electrical charge to the permeable material can be accomplished by applying an electrical field to the permeable material. This may be done by a conductive ring or other suitable contact. For example, if the chamber 16 is cylindrical, a conductive ring 32 (e.g., a brass ring) may be placed against the permeable material 24 located at the top of the chamber 16. A direct current (i.e., DC) is applied between the ring and the electrode 28 to impart a temporary electrical charge to the web. The voltage may be either positive (+) or negative (−).

Although the inventor should not be held to a particular theory of operation, electrically charging the permeable material 24 is believed to create a relatively uniform distribution of charged sites at individual exposed surfaces of the permeable material. For example, if the permeable material 24 is a matrix of fibrous material, electrically charging the matrix of fibrous material should create a relatively uniform distribution of charged sites at individual exposed surfaces of the fibrous material.

The permeable material 24 charged as described above is placed at the top of the chamber 16 (e.g., a fluidized bed chamber) and is held in place by a bracket. The primary gas supply 18 is started so that particulates 12 are suspended in a gas stream (not shown). The primary gas supply 18 and, if necessary, the boost gas supply 20, is adjusted using the flow amplifier 22 so that the gas stream carries particulates 12 up toward the permeable material 24.

Generally speaking, the adsorbent particulate material is selected from clay minerals and zeolites. For example, the clay minerals may be smectite minerals, montmorillonite clays, and bentonite clays. The bentonite clays may be sodium bentonite clays. Desirably, the bentonite clays are calcium bentonite clays, acidified bentonite clays and/or modified bentonite clays containing a flocculating agent. Suitable flocculating agents include, for example, gelatin. The zeolites are selected from natural zeolites and synthetic, crystalline, zeolitic sodium aluminosilicates of the molecular sieve type. For example, the zeolites may be crystalline zeolite Y and/or zeolitic aluminosilicates having a $SiO_2/Al_2O_3$ molar ratio of from 4.5 to 35 and the essential X-ray powder diffraction pattern of zeolite Y. Description of an example of a suitable zeolite may be found in, for example, U.S. Pat. No. 4,331,694 to Izod, the contents of which concerning zeolites is incorporated herein by reference. Some suitable zeolites may be characterized as being zeolitic aluminosilicates having a $SiO_2/Al_2O_3$ molar ratio of from 4.5 to 35, desirably 4.5 to 9, the essential X-ray powder diffraction pattern of zeolite Y, an ion-exchange capacity of not greater than 0.070, a unit cell dimension ao of from about 24.20 to 24.45 Angstroms, a surface area of at least 350 $m^2$/gram (B-E-T), a sorptive capacity for water vapor at 25° C. and a $p/p_0$ value of 0.10 of less than 5.00 weight percent and a Residual Butanol Test value of no more than 0.40 weight percent.

If desired, the particulates 12 may be electrically charged by way of an electrode system composed of an electrode 28 and a grounded metal band 30 (e.g., a conductive tape at ground potential) prior to contacting the permeable material 24. The grounded metal band 30 is located just below the bracket (not shown) which holds the permeable material in place. If a charge is applied to the particulates 12, the charge is desirably the opposite of the charge on the permeable material 24. However, if both positive and negative charges are present on the permeable material (e.g., if the permeable material has a positive charge on one side and a negative charge on the opposite side), the particulates may have either charge. As a practical matter, the particulates 12 should have a charge that permits them to contact and adhere to the portions of the permeable material where the particulates are desired.

Particulates having an inherent positive or negative charge may be substantially neutralized by passing the particulates through an electrical field provided by an electrode system composed of an AC (alternating current) electrode 26 and the grounded flow amplifier 22 (i.e., the flow amplifier at ground potential). For example, if particulates tend to have an inherent positive charge or even a mixed charge, the particulates may be passed through an alternating voltage field (via electrode 26 and grounded flow amplifier 24)) so that the particulates 12 are electrically neutral as the gas stream carrying the particulates passes towards and through the permeable material.

The strength of the electric field used to charge the particulates suspended in the gas stream may vary and can be appropriately determined by those of ordinary skill in the art. Generally speaking, the particulates may be subjected to electric fields which are between about 1 kVDC/cm and about 12 kVDC/cm. For example, electrical fields between about 5 kVDC/cm and 7.5 kVDC/cm have been found to be suitable.

The electrically charged permeable material 24 held in place by a bracket directly at the top of the chamber 16 is exposed to particulates 12 (which may or may not be electrically charged) that are suspended in a moving gas so that at least some particulates 12 adhere to the permeable material 24 at charged sites. The method of the present invention should not be limited only to exposure or application of particulates 12 suspended in a moving gas (e.g., using fluidized bed techniques). Particulates may be applied to the electrically charged permeable material 24 using other techniques such as, for example, spraying, gravity deposition, and the like.

Particulates which come into contact with the electrically charged permeable material 24 generally adhere to the material at the charged sites. Excess particulates are carried off by the gas stream and may be recirculated or collected in a trap. Successive contacts or exposures of the particulates with the electrically charged permeable material 24 may be carried out so that layers of particulates may be adhered to the material at charged sites. Alternatively and/or additionally, the material may be electrically re-charged prior to being re-exposed or re-contacted with particulates.

Although the inventors should not be held to any particular theory of operation, it is thought that a relatively uniform distribution of charged sites at individual exposed surfaces of the permeable material promotes and enhances the uniform distribution of particulate material on the individual exposed surfaces. As the particulates become attracted to and adhere to the charged sites, the particulates are either oppositely charged or induce an opposite charge in reference to the charged site. In some instances, it is possible for both positive and negative charges to be induced at opposite portions of a particulate adhering to a charged site. For example, if the charged site on the permeable material has a negative (−) charge, the portion of the particulate nearest the charged site may have a positive (+) charge and the portion of the particulate farthest from the charged site may have an induced negative (−) charge. Thus, if the particulates generally have an overall positive (+) charge, a different particulate may be attracted to and actually adhere to the negative (−) charge on the first particulate. It is thought that the charge transfer weakens as more particulates stack upon each other.

This stacking phenomena tends to occur more frequently with smaller particulate materials and relatively less frequently with larger particulate materials. Some stacked particulates are prone to being shaken loose or detached. This may be due to weakening or dissipation of the charge transfer between stacked particulates. Generally speaking, it is desirable to remove excess electrostatically adhered particulates from the permeable material using physical force or a removal technique. For example, the permeable material may be shaken, blown, brushed, vacuumed or the like.

After being adhered to the permeable material by electrostatic forces, the particulates are attached to individual exposed surfaces of the permeable material by substantially non-transient bonding. This step is considered important because the electrostatic forces can be temporarily overcome by physical forces (e.g., handling or by contact with aqueous solutions). The substantially non-transient bonding may be accomplished by any technique which generally fixes the particulates to individual exposed surfaces of the permeable material, either as coherent particulates or as a generally uniform coating created by melting or modifying the particulates.

Particulates adhering to the permeable material at charged sites may be attached by substantially non-transient bonding using heat. Sufficient heat to accomplish substantially non-transient bonding may be supplied by methods such as, for example, infra-red radiation, steam cans, hot ovens, microwaves, flame, hot gases, hot liquid, radio-frequency heating and combinations thereof.

Particulates adhering to the permeable material at charged sites can be attached by substantially non-transient bonding using adhesives. Adhesives may be applied to the permeable material prior to application of the particulates. Alternatively and/or additionally, adhesives may be applied to the permeable material after application of the particulates. Adhesives may be incorporated into the permeable material or into the particulates. Combinations of heat and adhesives may be used. For example, heat activated adhesives may be used to accomplish the substantially non-transient bonding. Particulates adhering to the permeable material at charged sites can be attached by substantially non-transient bonding due to chemical reaction between the particulate and the fibrous material.

Figure 2:
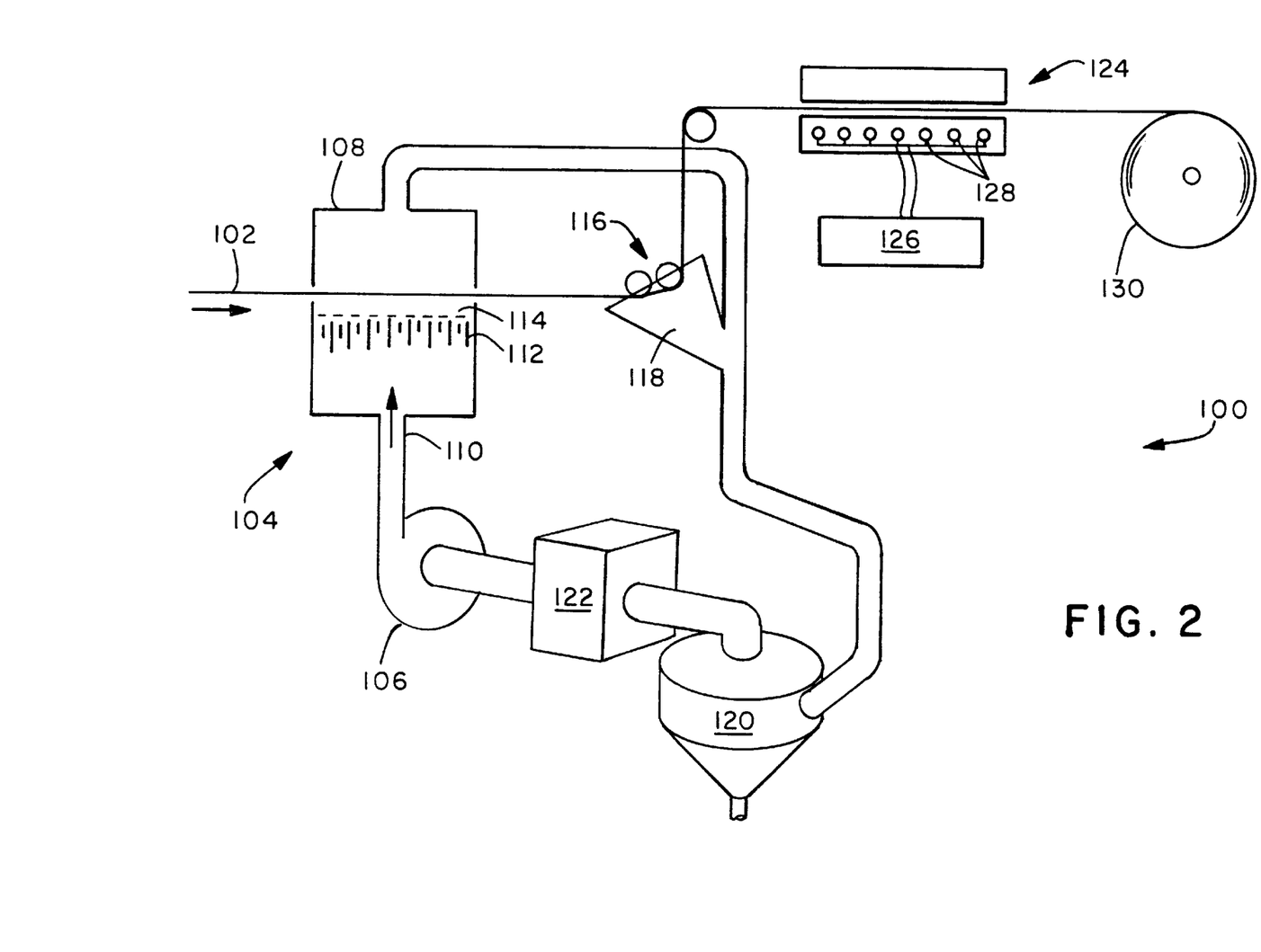
FIG. 2 is an illustration of an exemplary continuous method for attaching a relatively uniform distribution of particulates to individual exposed surfaces of fibers in a matrix of fibrous material.

Referring now to FIG. 2 of the drawings, there is illustrated at 100 (not necessarily to scale) an exemplary continuous process or method of making an adsorbent filter to remove caffeine from liquids. The filter is made by attaching a relatively uniform distribution of adsorbent particulates to individual exposed surfaces of a continuously advancing permeable material (e.g., a matrix of fibrous material). A continuously advancing, electrically charged permeable material 102 (e.g., an electret nonwoven fibrous web) is introduced into a fluidizer/coating chamber 104 and passes through the fluidizer/coating chamber 104 in the general direction of the arrows associated therewith. A ring compressor 106 provides fluidizing air to fluidizing/coating chamber 104 which includes a rectangular gas-tight housing 108, and other components shown in more detail in FIG. 3. Gas enters a gas inlet opening 110 in the general direction of the arrow associated therewith and passes through a flow straightener 112 and a fluidized bed screen 114. The system may be operated at gas flow rates and pressures readily determined by one of ordinary skill in the art. Particulates may be continuously introduced onto the fluidized bed screen 114 using a conveyor system, pneumatic particulate handling system or the like.

Gas flow through the fluidized bed screen 114 fluidizes the solid particulate material (not shown), which may or may not be electrically charged, and causes particulates to come into close proximity or contact with the electrically charged permeable material 102. At least a portion of the particulates adhere to the electrically charged permeable material 102 at charged sites at individual exposed surfaces that are present in a relatively uniform distribution over the charged portions of the permeable material. Particulate material adheres in a relatively uniform distribution to the charged sites due to electrostatic forces.

The electrically charged permeable material 102 and adhered particulates (not shown) are transported out of the fluidizing/coating chamber 104. The electrically charged permeable material 102 with adhered particulate material is introduced to eccentric rollers 116 which shake off excess particulate material into a catch tray 118. It should be understood that eccentric rollers are only one of many possible ways to remove excess particulate material. Excess particulate material is conveyed to a cyclone separator 120 while gas proceeds through a filter 122 to the inlet of the ring compressor 106. Particulate material still attached to the electrically charged permeable material 102 after shake-off through the eccentric rollers 116 proceeds to a radio frequency heater 124 where the radio frequency field generated by a power converter 126 is radiated into the particulate material on the electrically charged permeable material 102 by antenna rods 128. Radio frequency energy heats the particulate material causing it to heat the permeable material 102. The heated particulate material melts or softens the permeable material 102 at or about the point of contact so that the permeable material becomes non-transiently bonded or fused with the particulate material. In an embodiment of the invention, the permeable material may have a coating of hot melt adhesive or similar material such as poly (ethylene-vinyl acetate) which becomes activated during heating. For example, if the permeable material is a apertured film-like material, it may have a thin coating of a hot melt adhesive or similar material.

The non-transient bonding mechanism described above is intended to be exemplary and not limiting. Other bonding mechanisms or types of bonding may be used. For example, the particulate material itself may become softened by the heating so that it softens to fuse with or even coat at least portions of the permeable material. Desirably, the particulate material may be adapted to soften and fuse with and/or coat the permeable material at individual exposed surfaces where it adheres. The permeable material 102, thus treated, can be wound into a roll 130 and stored or introduced directly into other converting operations to make desired products.

Figure 3:
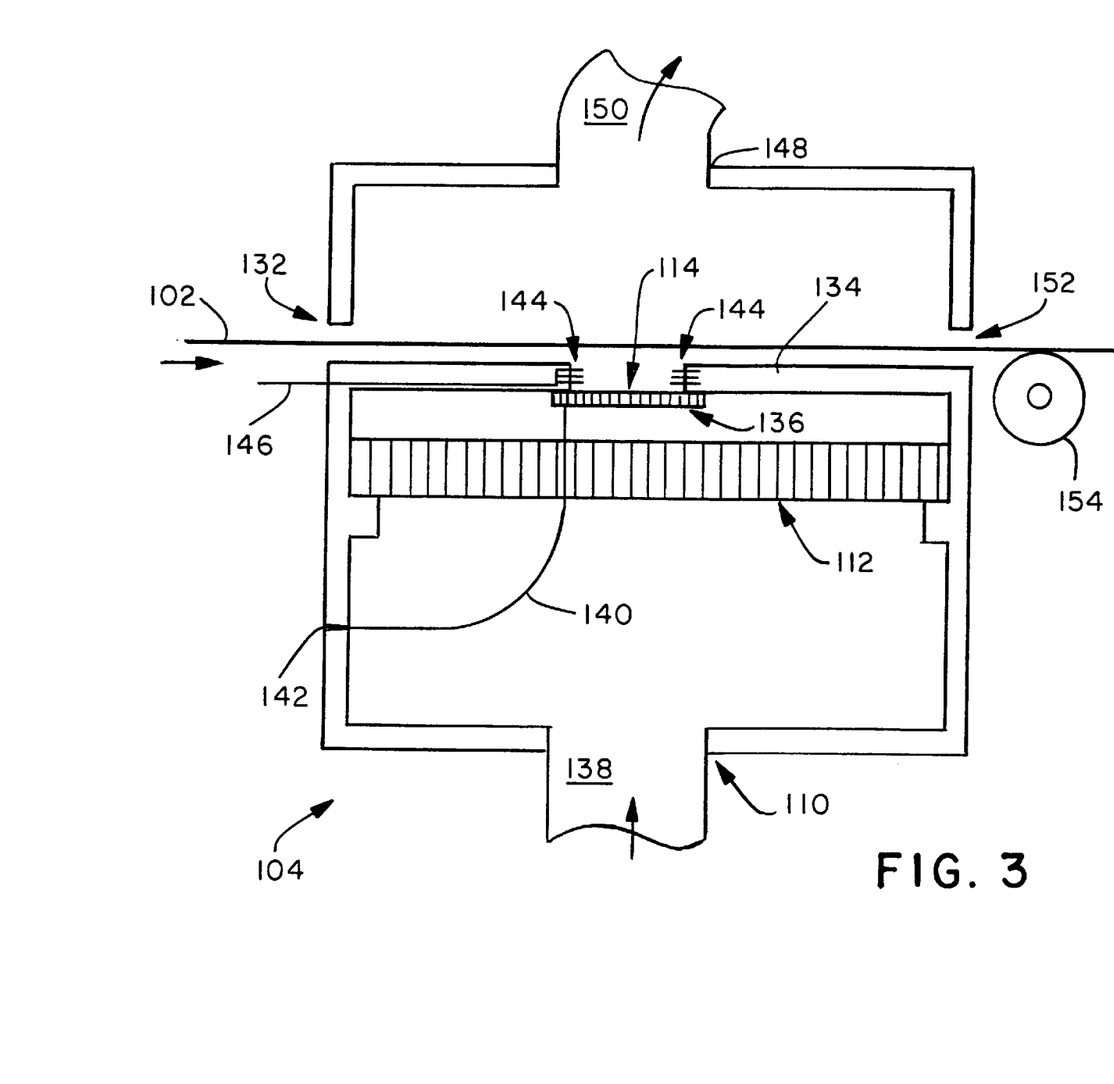
FIG. 3 is an illustration of a portion of an exemplary continuous method for attaching a relatively uniform distribution of particulates to individual exposed surfaces of fibers in a matrix of fibrous material.

FIG. 3 shows detail (not necessarily to scale) of the fluidizer/coating chamber 104 (in FIG. 2). The electrically charged permeable material 102 emerges from the electret charger system (not shown) and enters the fluidizer/coater chamber 104 through a slot 132. A slotted box top baffle 134 supports and locates an interchangeable fluidizer screen 114 by way of a retaining bracket 136. Exemplary fluidizer screens may be sintered metal screens having micrometer-sized opening. For example, useful fluidizer screens include 5, 10 and 20 micrometer ($\mu$m) pore size sintered metal screens available from Memtec American Corporation of Deland, Florida. Gas emerging from ring compressor 106 (FIG. 2) enters the fluidizer/coater chamber 104 through a hose 138 via inlet 110. The gas passes through the flow straightener 112 which may be, for example, a plastic honeycomb or similar flow straightener which could be selected by one of ordinary skill in the art. For example, an experimental setup used a flow straightener which was selected for the dimensions of the fluidizer/coater chamber 104 measured about 17 inches by 5 inches by about 1 inch in thickness with parallel honeycomb flow-straightening cells of about 3/16 inches in diameter. Gas leaving the flow straightener 112 passes through the fluidizer screen 114 levitating the solid particulate material to be adhered onto the electrically charged permeable material. Agglomeration of the solid particulate material can be prevented by adding microscopic bronze beads (not shown) from TSI Corporation, St. Paul, Minn., to the powder, the beads serving to keep any clumps of particulate material broken up. Levitated (e.g., fluidized) particulate material is put into the proximity of or contacted with the electrically charged permeable material 102 and is attracted to and adheres to the permeable material due to the electrostatic charges present in the permeable material and/or the particulate material.

Because some particulate materials may have an inherent charge that is the same type or similar to the electrically charged permeable material 102 and would thus be generally repelled instead of attracted, the metal fluidizer screen 114 is provided with a wire or lead 140 joined to a connector 142 so that the screen may be grounded, brought to a neutralizing or an opposite potential, as required, so that the fluidized particulate material adheres to the electrically charged permeable material 102. Alternatively and/or additionally, an array of electrical charging needles 144 may be disposed along the inner walls of the trough or opening (or multiple troughs or openings) in a baffle 134. The electrical charging needles 144 are connected to wires 146 so that a potential applied to the needles 144 alone or in conjunction with the potential applied to the fluidizing screen 114 will cause the particulate material to charge to a polarity that is generally neutral or even opposite the charge on the electrically charged permeable material 102 so that particulate material electrostatically adheres to charged sites at individual exposed surfaces of the permeable material 102.

Gas and stray particulate material flows through electrically charged permeable material 102 up through a port 148 and a hose 150 in the general direction of the arrows associated therewith and on toward the cyclone filter 120 (FIG. 1) to be recirculated.

The permeable material 102 and adhered particulate material proceeds out of the fluidizer/coater chamber 104 through a slot 152 and over a roller 154 on its way to the eccentric rollers 116 (FIG. 1) and to radio frequency heater 124 (FIG. 1).

Figure 4:
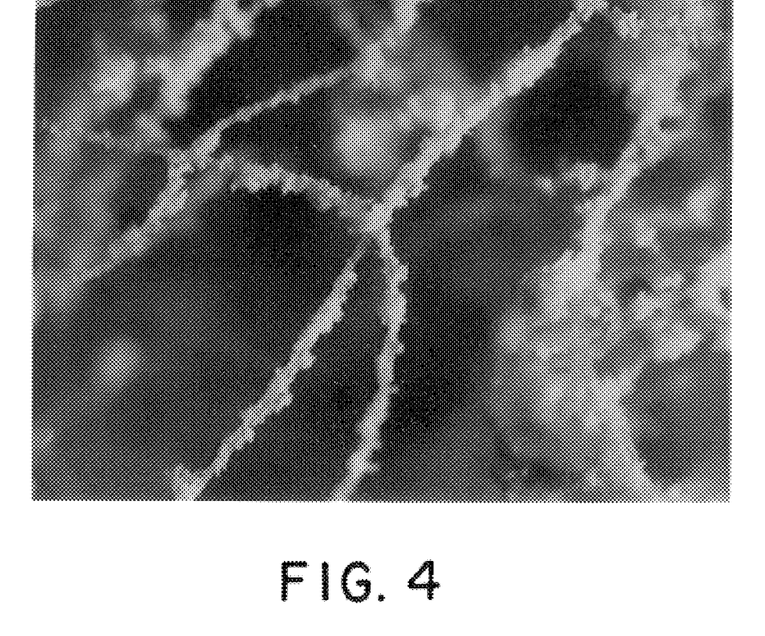
FIG. 4 is a photomicrograph of an exemplary fibrous composite structure composed of a matrix of fibrous material having exposed surfaces and a relatively uniform distribution of particulates attached to the exposed surfaces.

An important feature of the present invention is that a relatively uniform distribution of particulates adhere to the permeable material. Referring now to FIG. 4, there is shown a 51× (linear magnification) photomicrograph of an exemplary fibrous composite structure composed of a matrix of fibrous material having exposed surfaces and a relatively uniform distribution of particulates upon the exposed surfaces. FIG. 4 is a photomicrograph of the material from Example 1. More particularly, FIG. 4 shows a matrix of bicomponent spunbond filaments. The matrix was electrically charged and sodium aluminosilicate particulates having an average size ranging from about 1 micrometer to about 5 micrometers were applied to the matrix utilizing a fluidized bed. The particulates adhered to charged sites at a relatively uniform distribution on individual exposed surfaces of the filaments. The matrix containing adhered sodium aluminosilicate particulates was sintered to cause a low melting-point component of the bicomponent spunbond filaments to fuse with the sodium aluminosilicate. It could be seen that the particulates were bonded in a relatively uniform distribution to individual exposed surfaces of the filaments. The sodium aluminosilicate particulates adhered tightly to the individual exposed surfaces.

Figure 5:
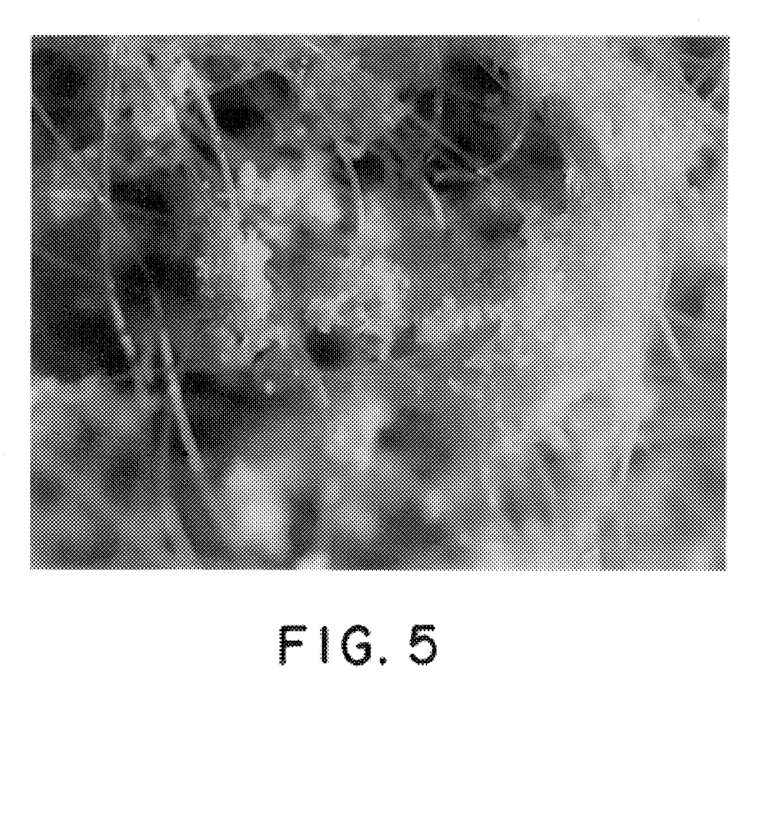
FIG. 5 is a microphotograph of an exemplary fibrous composite structure containing a matrix of fibrous material and a relatively gross physical entrapment/deposition of particulates in portions of the matrix (i.e., clumps of particulates).

The uniform distribution of adsorbent particulates on individual exposed surfaces of the filaments should be contrasted with adsorbent particulates that are caught in a fibrous matrix by relatively gross physical entrapment or entanglement. For example, FIG. 5 is a microphotograph that shows a matrix of bicomponent spunbond filaments. The matrix was not an electret and no electrical charge was applied to the matrix during exposure to the particulates. Particulates having an average size of about 100 microns were applied to the matrix utilizing a fluidized bed. Particulates became physically caught/entrapped or otherwise grossly deposited at portions of the matrix. As can be seen from FIG. 5, little, if any, particulates adhere to individual exposed surfaces of the filaments. Importantly, no relatively uniform distribution of particulates on individual exposed surfaces of the filaments is apparent.

Generally speaking, one important factor in making suitable filters is the type of adsorbent used. Zeolitic sodium aluminosilicates appear to work quite well. High-swelling forms of sodium bentonite (e.g. Volclay NF-BC from American Colloid) appear to fracture or break apart in water, which caused some of the particles to pass through the filter and into the filtrate. Lower swelling forms of bentonite clays such as the calcium form of bentonite and/or bentonite that has been treated with calcium, an acid or a flocculating agent such as, for example, gelatin appear to work well.

EXAMPLES

Various permeable materials were electrically treated and exposed to adsorbent particulate materials in order to produce a relatively uniform distribution of the adsorbent particulate materials on individual exposed surfaces of the permeable materials. The resulting materials were suitable as adsorbent filters for selectively removing caffeine from liquids.

Electret Treatment

If the material was a dielectric, a charge was applied so that an electret was formed utilizing conventional electret techniques or the method and apparatus described in FIG. 1. Generally speaking, the desired technique involves application of high voltage electric fields via direct current (i.e., DC) to form an electret and is described in U.S. Pat. No. 5,401,446, filed Oct. 9, 1992, previously incorporated by reference.

Particulates were applied to the electret material utilizing a fluidization chamber 16 that was formed of a Plexiglas® cylinder having an inside diameter of about 2 inches. Primary gas supply 18 and boost gas supply 20 were dried compressed air that was metered utilizing a variable air flowmeter 1–9.0 SCFM air series FL-73 from Omega Engineering, Inc., of Stamford, Conn. The primary gas supply 18, boost gas supply 20 (if any) were used to form a suspension of particulates in a moving gas stream that was regulated by a flow amplifier 22 (Transvector model 903 flow amplifier from the Vortec Corporation of Cincinnati, Ohio). A static eliminator power unit (7.5 kVAC—Simco Company, Inc., of Hatfield, Pa.) was connected between the electrode 26 and the grounded flow amplifier 22. The electrical charge applied to the permeable material and/or the particulates was generated by an electrostatic generator (+ or −7 kVDC) from the Chapman Company of Portland, Me. The air pressure on each side of the permeable material being treated was monitored by two Magnehelic® differential pressure gages (0–1.0 inch $H_2O$) from Dwyer instruments, Inc., of Michigan City, Ind. In some experimental setups, the air pressure of the gas stream just below the flow amplifier was monitored by a Magnehelic® differential pressure gage (0–30.0 inch $H_2O$). Once the gas stream containing entrained particulates passed through the permeable material, it entered a filter trap 28 (Fine Dust Filter Kit #2W708 from W. W. Grainger, Inc., of Roswell, Ga.).

Particulate Material

The adsorbent particulate material to be fluidized was placed on the screen at the bottom of chamber 16 shown in FIG. 1. A voltage was applied to the particulate material utilizing an electrode 24 located in the side of the chamber 16.

The permeable materials were 4-inch diameter circles of material. The particular area that was treated covered only a 2-inch diameter circle. The 4-inch diameter samples were weighed and the weight of the 2-inch diameter portion was determined by multiplying the weight (of the 4-inch diameter circle) by 0.25. Each sample was placed in the sample holder at the top of chamber 16 in FIG. 1.

The adsorbent particulates were fluidized by dry air and allowed to contact and/or pass through the permeable material. The primary fluidizing air flow and the boost flow, if any, were reported in standard cubic feet per minute (SCFM). Pressure across the sample was monitored and reported in inches of water. Fluidized particulates were allowed to contact the permeable material and accumulate until the pressure drop across the permeable material increased to about 0.25 inches of $H_2O$ unless otherwise noted. Excess particulates were trapped for disposal. The treated materials were weighed and the weight of the solid on the web was reported.

The treated materials were sintered at 125 to 135° C. for four to six minutes in a circulating air oven.

Assay Method for Caffeine Detection in Brewed Coffee High-Pressure Liquid Chromatography (HPLC)

A method using HPLC was developed in order to analyze coffee samples. The samples were diluted to 10% strength using distilled water, and filtered through a 0.45-micrometer syringe filter prior to analysis by HPLC. The conditions were as follows:

Column: 6-micrometer YMC-Pack Polymer C-18 (4.6 mm diameter×150 mm length)

Detector: UV at 274 nm

Mobile Phase: water/methanol/acetonitrile (90/7/3 by volume)

Flow Rate: 1.5 mL/minute

Injection Volume: 25 μL

Under these conditions, the caffeine eluted at 9.5 minutes. A calibration curve was generated using caffeine solution standards; the concentration of a sample was calculated from this curve. The percent caffeine removal was calculated using Equation (1).

Percent Caffeine Removal = Eq.(1)

$$\left[ \left( \frac{Concentration}{C_8H_{10}N_4O_{2\,SAMPLE}} \Big/ \frac{Concentration}{C_8H_{10}N_4O_{2\,CONTROL}} \right) \right] \times 100$$

Example #1

Zeolite Coated onto Nonwoven Web

Sodium Aluminosilicate particles having an average particle size of about 1 to 5 micrometers, available under the designation Zeolite 07342-14C (Na Al Silicate) from UOP of Tarrytown, N.Y., were applied to a 6 ounce per square yard (~200 gsm) nonwoven web of bicomponent spunbond side-by-side filaments containing 50%, by weight, polypropylene and 50%, by weight, polyethylene (available from Kimberly-Clark Corporation) utilizing the procedure described at the beginning of the Examples. The fluidizing flow was set at 1.5 Standard Cubic Feet per Minute (SCFM), boost flow was 1.0 SCFM, pressure drop across the permeable material was 1 inch $H_2O$. The weight of sodium aluminosilicate on the web after sintering was 0.27 grams. FIG. 4 is a photomicrograph of the web showing a relatively uniform distribution of adsorbent zeolitic aluminosilicate particulate material attached to individual exposed surfaces of the fibrous material by substantially non-transient bonding. Such a relatively uniform distribution of particulates should be distinguished from a relatively gross physical entrapment/entanglement of particulates in portions of the matrix (i.e., clumps of particulates) which is less desirable. For example, particulates that are physically caught/entrapped or otherwise grossly deposited at portions of the matrix tend to be more difficult to non-transiently bond to individual exposed surfaces of the fibrous matrix. Thus, a matrix containing the physically entrapped/grossly deposited adsorbent particulates tends to shed or lose particulates more readily than a relatively uniform distribution of adsorbent zeolitic aluminosilicate particulate material attached to individual exposed surfaces of the fibrous material by substantially non-transient bonding.

Example #2

Zeolite Coated onto Nonwoven Coformed Web

Part A—Filter Preparation

A coformed batt was prepared generally in accordance with U.S. Pat. No. 4,100,324. The batt had a basis weight of about 80 gsm and contained about 60 percent, by weight, pulp and about 40 percent, by weight, polypropylene. Four-inch diameter disks were cut from the batt and treated with a zeolite which is generally described at, for example, U.S. Pat. No. 4,331,694 to Izod. Generally speaking, the zeolite is a zeolitic aluminosilicate having a $SiO_2/Al_2O_3$ molar ratio of from 4.5 to 35, the essential X-ray powder diffraction pattern of zeolite Y, and a particle size in the range of 1 to 5 micrometers and is available under the trade designation Zeolite 07342-14A (Na Al Silicate) from UOP of Tarrytown, N.Y.

Approximately twenty samples were prepared utilizing the procedure described at the beginning of the Examples. Each sample contained about 0.055 grams of zeolite for a total of 1.1 grams in the set of twenty samples. The untreated portion of the four-inch diameter disk was removed leaving a two-inch diameter disk containing zeolite.

Part B—Evaluation of Filters

The bottom of the filter was enclosed in filter paper and the filter was inserted into a two-inch inside diameter extraction cup. The extraction cup was composed of a 3.5 inch section of Schedule 40 Pvc pipe having a two-inch inside diameter. A 100-mesh stainless steel wire was placed on one end of the pipe and a two-inch PVC cap was fitted over the wire and glued in place. The two-inch cap had a 0.070 inch diameter drain hole in the center to provide a minimum drain time of about 60 to 90 seconds.

Coffee was prepared in a 2-burner, Bunn Pour-Omatic® drip coffee machine using 50 g Maxwell House® regular coffee grinds with 1650 g tap water. After brewing, the regular coffee was split into several separate 170-mL portions, one to serve as the control ("regular coffee") and the others to be treated using the filters.

The control coffee contained 430 ppm of caffeine. Twenty adsorbent filters were tested. The filters required about 80 seconds for the coffee (at 156° F.) to pass through. The filtered coffee contained about 140 ppm of caffeine.

Example #3
Bentonite Coated onto Nonwoven Web
Part A—Filter Preparation

A polyethylene sheath/polyester core nonwoven web was electret treated and then coated with sodium bentonite clay (Volclay NF-BC from American Colloid) utilizing the procedure described at the beginning of the Examples. The material was heat-treated in an oven at 135° C. for 6 minutes to bind the clay onto the softened polyethylene sheath. Two 2-inch diameter disks were cut from this material; both disks weighed ca. 0.68 g and contained 0.26 g (38 wt %) bentonite.

Part B—Evaluation of Filters

The disks were placed in a Millipore® vacuum filtration device for testing. House vacuum was necessary to pull the coffee through the nonwoven filter. Five 3-mL portions of freshly brewed, 75° C. coffee were pulled through the filter using vacuum, with each portion having a total contact time of 5–10 seconds with the filter. The filtrate from each portion was collected for HPLC analysis to determine the caffeine content. The caffeine content of each portion was compared to a control of the brewed coffee with no treatment. The results of this study are summarized in Table I, which showed a total of 54% decaffeination from all five portions (15 mL coffee, equivalent to a 2.9 g/cup ratio). Higher ratios of bentonite per cup of coffee were found to provide up to 98% decaffeination with such a filter.

TABLE I

Caffeine Removal of Bentonite-Coated Nonwoven

| Portion # | % Caffeine Removal | | |
|---|---|---|---|
| | Individual Portion | Avg % Removal of all portions | (Avg g/cup) |
| 1 | 98.3% | 98.3% | (14.7 g/cup level) |
| 2 | 64.3% | 81.3% | (7.4 g/cup level) |
| 3 | 47.0% | 69.9% | (4.9 g/cup level) |
| 4 | 29.6% | 59.8% | (3.7 g/cup level) |
| 5 | 28.1% | 53.5% | (2.9 g/cup level) |

Disclosure of the presently preferred embodiments and examples of the invention are intended to illustrate and not to limit the invention. It is understood that those of skill in the art should be capable of making numerous modifications without departing from the true spirit and scope of the invention.

What is claimed is:

1. An adsorbent filter for removing caffeine from liquids, the filter comprising:

a liquid permeable, electret-treated matrix of fibrous material having electrically charged sites at individual exposed surfaces; and a relatively uniform distribution of an adsorbent particulate material attached to said electrically charged sites at individual exposed surfaces of the fibrous material, said particulate material being chosen from the group consisting of zeolites and clays, said particulate material being attached to such surfaces by substantially non-transient bonding so that passage of a liquid having a caffeine concentration ranging from about 40 to about 100 mg per 100 mL of liquid through the matrix for a contact time of less than about 2 minutes results in at least a 40 percent reduction in the caffeine concentration of the liquid.

2. The adsorbent filter of claim 1, wherein the filter is adapted to provide at least a 40 percent reduction in the caffeine concentration for about 1 cup to about 40 cups of the liquid.

3. The adsorbent filter of claim 1, wherein the filter is adapted to provide at least a 60 percent reduction in the caffeine concentration for about 1 cup to about 40 cups of the liquid.

4. The adsorbent filter of claim 1, wherein the filter is adapted to provide at least a 80 percent reduction in the caffeine concentration for about 1 cup to about 40 cups of the liquid.

5. The adsorbent filter of claim 1, wherein the matrix of fibrous material is selected from woven fabrics, knit fabrics and nonwoven fabrics.

6. The adsorbent filter of claim 5, wherein the nonwoven fabric is a nonwoven web selected from meltblown fibrous webs, continuous spunbonded filament webs, bonded carded fibrous webs, and wet-laid fibrous webs.

7. The adsorbent filter of claim 6, wherein the nonwoven web includes fibers selected from synthetic fibers, natural fibers, and pulp.

8. The adsorbent filter of claim 1, wherein the fibrous material is selected from thermoplastic polymer fibers and thermoplastic polymer filaments.

9. The adsorbent filter of claim 8, wherein the thermoplastic polymer comprises a polymer selected from polyolefins, polyamides and polyesters.

10. The adsorbent filter of claim 9, wherein the polyolefin is selected from polyethylene, polypropylene, polybutene, ethylene copolymers, propylene copolymers, and butene copolymers and blends of these polyolefins.

11. The adsorbent filter of claim 10, wherein at least a portion of the fibrous material is bi-component fibrous material selected from bi-component fibers and bi-component filaments.

12. The adsorbent filter of claim 1, wherein the adsorbent particulate material is selected from zeolitic aluminosilicates having a $SiO_2/Al_2O_3$ molar ratio of from 4.5 to 35 and the essential X-ray powder diffraction pattern of zeolite Y.

13. The adsorbent filter of claim 1, wherein the filter contains from about 10 to about 90 percent, by weight, adsorbent material.

14. An adsorbent filter for removing caffeine from liquids, the filter comprising:

a liquid permeable, electret-treated matrix of fibrous material having electrically charged sites at individual exposed surfaces; and a relatively uniform distribution of an adsorbent particulate material attached to said electrically charged sites at individual exposed surfaces of the fibrous material, said particulate material being chosen from the group consisting of zeolites and clays, said particulate material being attached to such surfaces by substantially non-transient bonding so that passage of from about 1 cup to about 40 cups of a liquid having a caffeine concentration ranging from about 20 to about 100 mg per 100 mL of liquid through the matrix for a contact time of less than about 2 minutes results in at least a 40 percent reduction in the caffeine concentration of the liquid.

15. The adsorbent filter of claim 14, wherein the filter contains from about 10 to about 90 percent, by weight, adsorbent material.

16. The adsorbent filter of claim 14 wherein the adsorbent zeolite particulate material is selected from zeolitic aluminosilicates having a $SiO_2/Al_2O_3$ molar ratio of from 4.5 to 35 and the essential X-ray powder diffraction pattern of zeolite Y.

17. An adsorbent filter for removing caffeine from liquids, the filter comprising:
   a liquid permeable, electret-treated matrix of fibrous material having electrically charged sites at individual exposed surfaces; and
   a relatively uniform distribution of adsorbent zeolite particulate material attached to said electrically charged sites at individual exposed surfaces of the fibrous material, said particulate material being attached to such surfaces by substantially non-transient bonding, the adsorbent zeolite particulate material being selected from zeolitic aluminosilicates having a $SiO_2/Al_2O_3$ molar ratio of from 4.5 to 35 and the essential X-ray powder diffraction pattern of zeolite Y, so that passage of from about 1 cup to about 40 cups of a liquid having a caffeine concentration ranging from about 20 to about 100 mg per 100 mL of liquid through the matrix for a contact time of less than about 2 minutes results in at least a 40 percent reduction in the caffeine concentration of the liquid.

* * * * *